Jan. 17, 1956 S. K. ANDERSEN 2,731,239
OIL COOLER COOLED BY AIR AND FUEL
Filed June 15, 1951 4 Sheets-Sheet 1
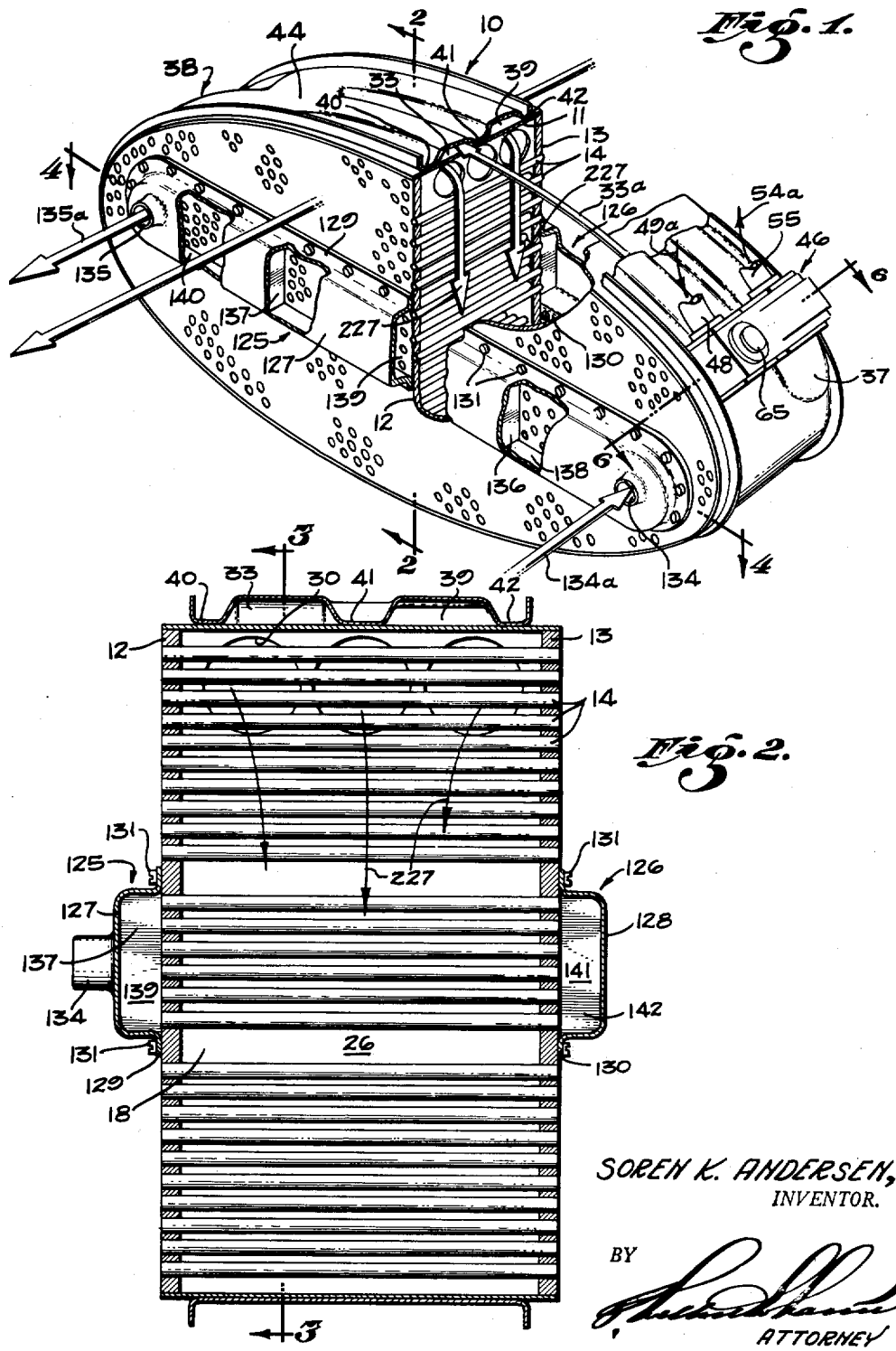
Fig. 1.
Fig. 2.
SOREN K. ANDERSEN,
INVENTOR.
BY 
ATTORNEY Jan. 17, 1956           S. K. ANDERSEN           2,731,239
OIL COOLER COOLED BY AIR AND FUEL
Filed June 15, 1951           4 Sheets-Sheet 2
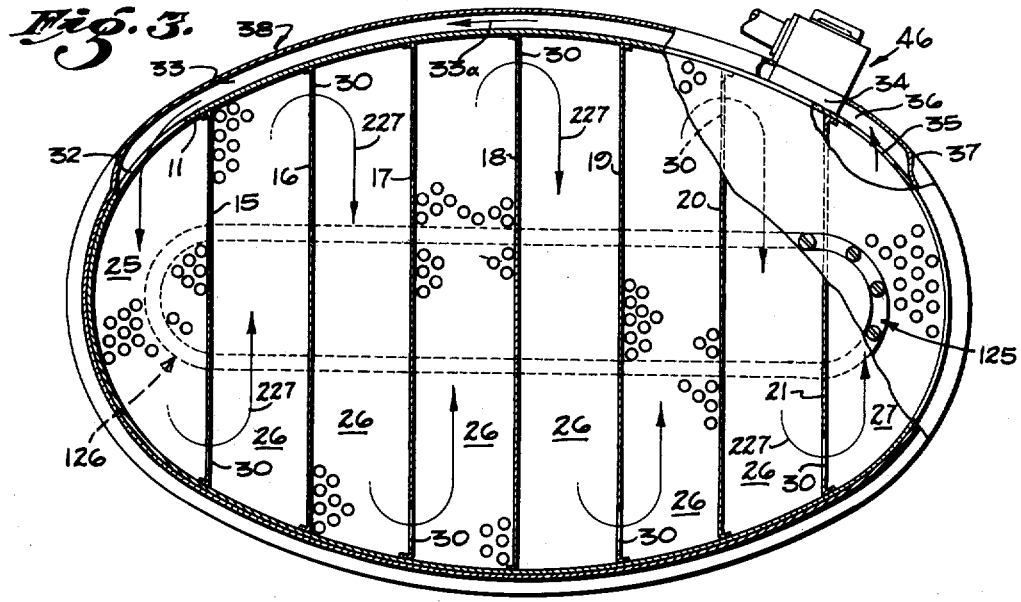
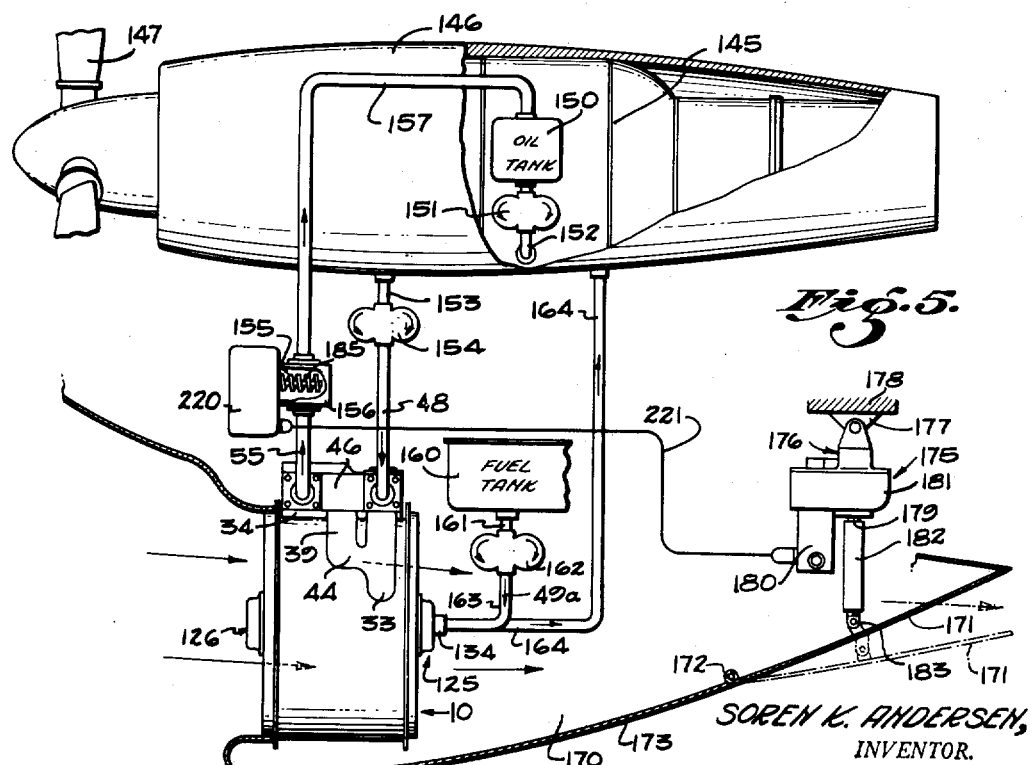
SOREN K. ANDERSEN,
INVENTOR.
BY
ATTORNEY

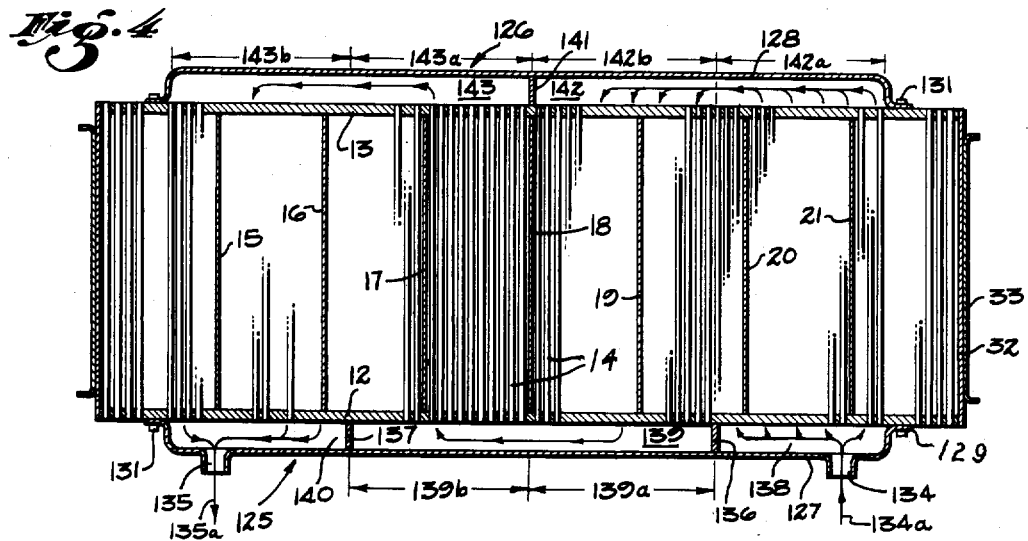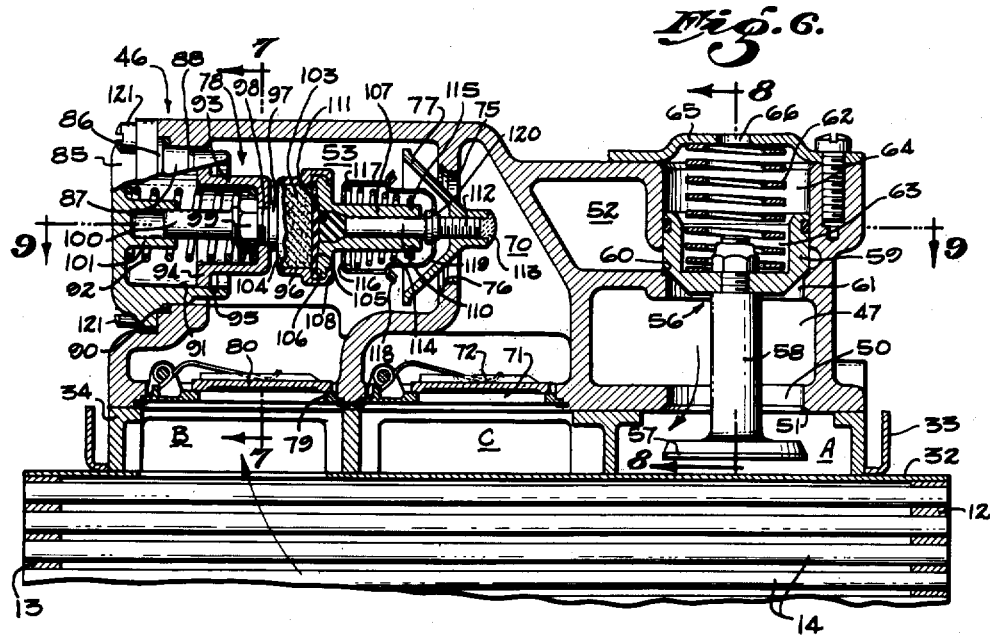

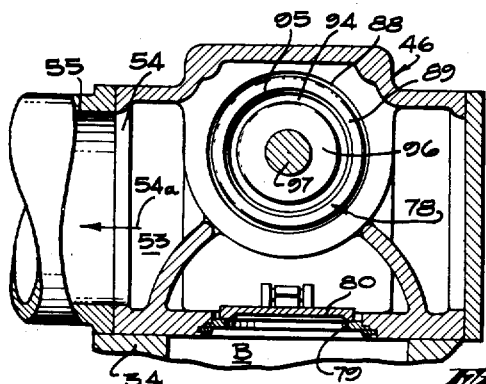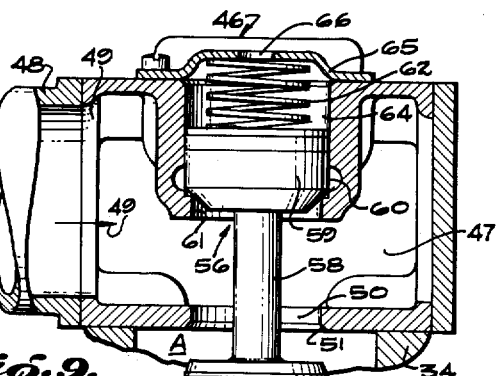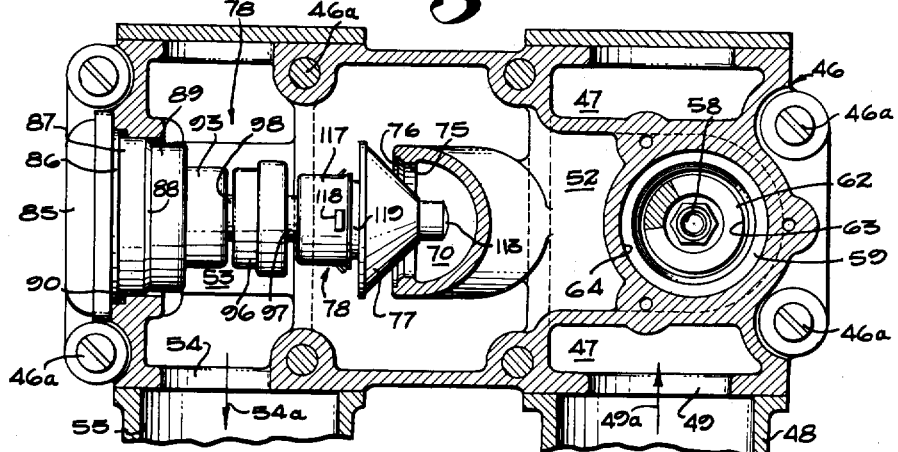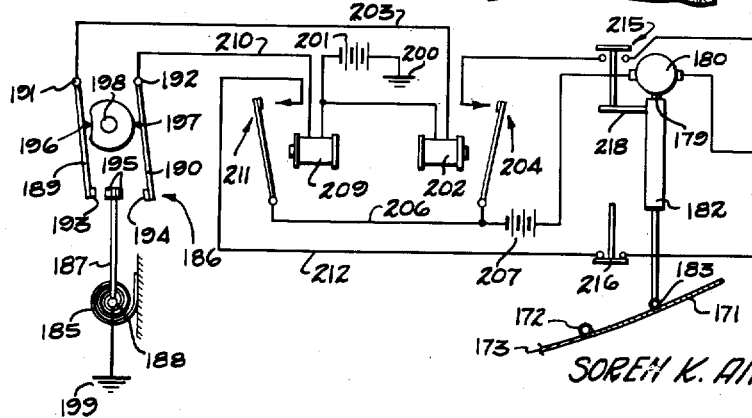
SOREN K. ANDERSEN,
INVENTOR.
BY
ATTORNEY

United States Patent Office 2,731,239
Patented Jan. 17, 1956

2,731,239
OIL COOLER COOLED BY AIR AND FUEL

Soren K. Andersen, Los Angeles, Calif., assignor to The Garrett Corporation, Los Angeles, Calif., a corporation of California Application June 15, 1951, Serial No. 231,863

1 Claim. (Cl. 257—2)

This invention relates generally to heat exchangers and relates more particularly to oil coolers for internal combustion engines and the like.

While the present invention has particular utility in connection with lubricating systems of internal combustion engines, particularly gas turbines, and is herein shown and described in connection with such a system, it is to be understood that its utility is not limited thereto.

With the advent of high speed and/or long range types of gas turbine driven aircraft, there has developed a necessity for adequate cooling of the lubricating oil.

In such aircraft certain problems are involved in the provision of proper conditioning of the lubricating oil, one of said problems arises from the fact that limited space is available and, hence, the cooler must be adequate and yet be of relatively small size, and must be highly efficient. Other features involved in the present problem include the relatively small heat rejection of the parts of gas turbine engines, and the extremely high temperature rise of ram air for the oil cooler so that adequate cooling cannot be effected with such high temperature air.

It is, therefore, an object of the present invention to provide an oil cooler which will overcome the above mentioned difficulties and solve the problems involved.

Another object of the invention is to provide an apparatus of this character which will properly control the condition of the oil under various operating conditions.

In view of the relatively low heat rejection to the air, as compared to the power output of the engine and hence its fuel consumption, it has been found that the fuel may be used as an effective coolant for oil coolers of such engines.

Still another object of the invention is to provide a device of this character using a plurality of coolant means.

A further object of the invention is to provide a device of this character wherein there is means for controlling the flow of oil through the cooler.

A still further object of the invention is to provide a device of this character having a liquid and gaseous coolant means.

Another object of the invention is to provide a device of this character wherein fuel and air are used for cooling the oil.

Still another object of the invention is to provide a device of this character wherein the engine fuel constitutes the primary coolant medium and air is used as a supplemental coolant medium.

A further object of the invention is to provide a device of this character that is compact.

A still further object of the invention is to provide a device of this character that is highly efficient.

It is believed that invention resides not only in the heat exchanger itself but also in systems and methods such as disclosed herein.

Other objects and advantages of the invention will be brought out in the following part of the specification.

Referring to the drawings, which are for illustrative purposes only:

Fig. 1 is a perspective view of an oil cooler embodying the invention, portions of the cooler being broken away to show various structural features;

Fig. 2 is an enlarged transverse section through the cooler taken on line 2—2 of Fig. 1;

Fig. 3 is a sectional view taken on line 3—3 of Fig. 2 but on a somewhat reduced scale with respect to the showing in said Fig. 2;

Fig. 4 is an enlarged sectional view taken on line 4—4 of Fig. 1;

Fig. 5 is a schematic or diagrammatic view of a gas turbine-propeller engine having lubricating and fuel systems and with the present invention embodied therein, portions of the structure being shown in section;

Fig. 6 is a sectional view through the cooler valve mechanism taken on line 6—6 of Fig. 1;

Fig. 7 is a sectional view taken on line 7—7 of Fig. 6;

Fig. 8 is a sectional view taken on line 8—8 of Fig. 6;

Fig. 9 is a sectional view taken on line 9—9 of Fig. 6; and

Fig. 10 is a diagram showing the electrical control system.

Referring now to the drawings, the oil cooler, indicated generally at 10, is shown as comprising a tubular shell 11 flattened so as to have an approximately elliptical form and having a major axis and a minor axis. As is shown in the drawings, the major axis is horizontally disposed and the minor axis is vertically disposed; however, it is to be understood that the cooler may have other arrangements and/or have other forms. End or header plates 12 and 13 are secured to the shell in the usual manner, said end plates having a plurality of openings therethrough in which the respective ends of heat transfer or radiator tubes 14 are secured. The tubes 14 are arranged in rows in the usual manner and constitute the radiator core of the device.

Within the radiator core are a plurality of baffle plates 15, 16, 17, 18, 19, 20, and 21. These baffle plates are arranged in parallel relationship to each other and also extend in parallel relation to the minor axis of the cooler, said baffle plates being laterally spaced apart from each other, that is, said baffles are spaced apart with respect to the major axis of the device. The respective ends of the baffles are secured to the shell in the usual manner. The number of baffles depend on various factors and there may be more or less than the number shown herein, depending upon the requirements of the particular installation. The baffles define an inlet chamber 25, intermediate chambers 26 respectively and an outlet chamber 27 and the baffles are provided with openings 30 adjacent alternate ends so as to interconnect said chambers in such a manner that they form a tortuous flow path through the cooler core. At one end of the inlet chamber 25 there is an inlet opening or port 32 in the shell 11 which is connected by an inlet passage 33 with an inlet space A in a fitting 34 secured to the outer side of the shell by any suitable well-known means such as welding, brazing or the like. The fitting 34 also has an outlet space B and a warm-up by-pass space C between said spaces A and B.

The shell 11 has an outlet port 35 for the outlet chamber 27, said port 35 being on the opposite side of the cooler from the inlet port 32. The fitting 34 is located on the top side of the cooler between ports 32 and 35 and adjacent the latter. The port 35 is connected by an outlet passage 36 with the outlet space B of the fitting, said passage being defined by a channelled member 37 which is welded or otherwise suitably secured to the shell 11. The passage 33 is defined on the outer sides by the bottom and side walls of an inverted U-shaped channel formed in sheet metal jacket 38. The jacket also includes a warm-up bypass 39 formed by suitable stamping of said piece of sheet metal so as to provide a similar channel, the underlining portions of the shell 11 forming the remaining sides of the passages 33 and 39. The jacket has portions 40, 41 and 42 which engage the outer surface of the shell 11 and said portions 40, 41 and 42 are brazed or welded to the shell. At the side of the cooler adjacent the compartment 25, there is a connection 44 between the passage 33 and the passage 39, the latter extending along the upper surface of the shell 11 substantially parallel with the passage 33 and has an outlet which is connected to the warm-up outlet space C in the fitting.

Valve mechanism for controlling the flow of oil through the cooler is provided and includes a housing, indicated generally at 46, secured to the fitting 34 by screws 46a (Fig. 9). The housing is formed with an inlet chamber 47 for receiving oil from the engine through a conduit 48 which is connected to the inlet chamber 47 through an oil inlet port 49. The chamber 47 is connected with the inlet space A by means of an opening or port 50 having a valve seat 51 thereabout at the lower end, as shown in Figs. 6 and 8. The port 50 is normally open but under certain conditions, as, for instance, in the case of a sudden pressure build-up of the oil, said port is adapted to be closed to relieve the pressure by bypassing it from said chamber 47 through a direct bypass 52 into a valve chamber 53 from which it travels through an outlet 54 to a conduit 55 for the return of oil to the engine.

For effecting this pressure relief for the chamber 47, a pressure relief valve, indicated generally at 56, is provided and comprises a valve member 57 on one end of a stem 58 and a cylindrical valve 59 at the other end thereof. The cylindrical valve 59 is normally held on a seat 60 formed about a port 61 connecting the chamber 47 with the bypass 52 by a spring 62 disposed in the cylindrical interior 63 of the valve 59 and contained within a chamber 64 in the housing 46, there being a cap 65 covering the outer end of the chamber 64. An opening 66 in the cap prevents undesired pressures in the chamber 64, which pressures would otherwise result with movements of the valve member 59.

Cap 65 also provides means against which one end of spring 62 reacts which urges the valve 59 in the closing direction and valve 57 in the opening direction.

When, for any reason, a pressure develops in the chamber 47 which is in excess of the pressure resisted by said spring 62, cylindrical valve 59 is raised against the tension of said spring 62 so that the port 61 is open. Concurrently, the valve 57 at the other end of the stem 58 is seated, thereby closing the port 50. Thus the double valve 56 opens communication between the chamber 47 and the bypass chamber 52 so as to relieve the pressure in chamber 47 whereupon valve members 59 and 57 are returned to their normal positions by spring 62, said normal positions being shown in Fig. 6.

The housing 46 is also formed with a bypass chamber 70 which has an opening or port 71 and a check valve 72 to prevent reverse flow through said port 71. The port 71 communicates with the warm-up outlet space C in the fitting 34. As has already been pointed out, the space C is connected with the outlet of the warm-up passage 39. The warm-up bypass chamber 70 is connected with the outlet chamber 53 by a port 75 which has a valve seat 76 engageable by a valve member 77 of a thermostatic control valve assembly or mechanism indicated generally at 78.

The valve mechanism 78 has a temperature responsive element, which will be more fully described hereinafter, responsive to the temperature of the oil leaving the cooler, and more particularly the oil in the outlet chamber 53. Chamber 53 is connected with the outlet space B through a port 79 controlled by a check valve 80 which prevents reverse flow between the chamber 53 and space B.

The mechanism 78 comprises a base portion 85, a reduced diameter portion 86 on the interior side, an intermediate part 87 having an inwardly tapered shoulder 88 terminating in an interior end part 89. The parts 86 to 89 inclusive are received in a suitable opening provided therefor in the housing 46 and the part 86 provides a shoulder for a gasket 90 which also is engaged by a shoulder provided therefor in the housing structure. The parts 86 to 89 inclusive are hollow as indicated at 91 thereby providing a spring chamber for a spring 92, the purpose of which will be hereinafter described. Valve mechanism 78 also includes a cup shaped part 93 having an outwardly extending annular flange 94 about the rim which is received within the spring chamber 92, the open end of the cup member 93 facing the chamber 91. A snap ring 95 is received in a suitable groove provided therefor adjacent the free end of the part 89 to, thereby, prevent the cup part 93 from being moved out of the chamber 91 and to serve as a stop against outward movement of said cup with respect to said chamber 91.

The mechanism 78 also includes a hollow member 96 which is arranged oppositely of the cup member 93 and which has a stem 97 with a reduced threaded part 98. The end portion of the cup 93 is received and secured on the stem 97 by means of a nut 99. From the threaded portion 98 of the stem 97, there is a reduced diameter extension 100 slidably received in a hollow guide 101 formed integrally with the base 85. Within the hollow member 96 is disposed suitable thermo-responsive material 103 of well-known character and said material is disposed between the closed end or bottom 104 of the member 96 and a resilient diaphragm 105 marginally clamped between a shoulder of said member 96 and a flange 106 of a tubular guide 107 which is secured in the member 96 by an overturned flange 108 at the free end of said member 96. Slidably received in the tubular guide 107 is a stem 110, between the inner end of the stem 110 and the diaphragm 105 is a resilient plug 111 which urges the stem outwardly upon expansion of the material 103 in the member 96. The valve member 77 is threadably received on the outer threaded end 112 of the stem 110 and is secured against inadvertent movement by soldering at 113 or by any other suitable means. Means for urging retraction of the valve member 77 with respect to the shell 96 and stem 107 is effected by a spring 114 which reacts between a retaining ring 115 secured in a groove provided therefor adjacent the free end of the guide 107 and the central portion 116 of a yoke having arms 117 which extend toward the valve 77 and which have openings therein for reception of ears 118 of a cup-like spring retainer 119 received on the outer end portion of stem 107 and abutting against an outwardly extending flange 120 of said stem 107. Thus when the material 103 contracts, the spring moves the valve to the left, as shown in Fig. 6, and yields upon expansion of the material 103 so that the valve 77 may be moved, in response to temperature increase, in the closing direction. The cup 93 and parts connected thereto to the right thereof, as shown in Fig. 6, are adapted to move leftwardly against the resistance of spring 92 when the pressure in the chamber 70 is above the pressure necessary to cause the spring 92 to yield. The valve mechanism 78 is secured in the housing 46 by a plurality of screws 121.

Two fluid coolant mediums are used, one a liquid, such as fuel for the engine, and the other, air. In order to utilize the fuel as a coolant, covers, generally indicated at 125 and 126, are provided at the respective ends of the cooler core. These covers are cast or formed of sheet metal and are so shaped as to provide elongated channels 127 and 128 respectively having outwardly extending peripheral flanges 129 and 130. The flanges 129 and 130 are provided with spaced openings for reception of screws 131 threadably received in suitable openings in the adjacent end or header plates 12 and 13. It is to be noted that the portions of the end plates beneath the flanges do not have tube receiving openings thereto as is best shown in Figs. 2 and 4.

The spaces defined by the channels 127 and 128 of the covers and the portions of the end plates 12 and 13 beneath said channel portions define passages for the flow of the engine fuel as will be more particularly described hereinafter. The cover 125 is provided with an inlet 134 and an outlet 135 and is also provided with a pair of cross baffles 136 and 137 (Fig. 4) thereby dividing the cover into an inlet passage 138, an intermediate passage 139 and an outlet passage 140. The cover 128 has a similar partition 141 approximately midway between the ends of the cover providing passages 142 and 143.

The flow of fuel through the cooler for purposes of cooling the oil is as follows. The fuel enters the inlet 134 as indicated by the arrow 134a. The fuel then enters inlet passage 138 and flows into the adjacent ends of the tubes 14 covered by the portion of the cover defining said passage 138. The fuel flows through said tubes into the portion 142a (Fig. 4) of the passage 142 adjacent one end thereof. From portion 142a, the fuel flows into the other part or portion 142b of the passage 142 and thence through the radiator tubes covered by said end portion 142b into the end portion 139a of the passage 139 communicating with said tubes and from this portion of the passage 139, the fuel flows into the portion 139b of the passage 139. Thence the fuel flows into and through the tubes communicating with said portion of the passage 139 and into the portion 143a of passage 143 with which the last mentioned tubes communicate. The fuel then flows into the other end portion 143b of the passage 143 and thence through the tubes communicating with said portion 143b into the outlet passage 140. The fuel leaves passage 140 by way of the outlet 135 as indicated by arrow 135a.

From the foregoing, it will be apparent that the tubes through which fuel flows provide a cooling zone or region from substantially one side of the cooler core to the other (with respect to the major axis in the present showing) and that the oil flowing through the cooler core flows back and forth through this region across said tubes.

Referring now to Fig. 5, a gas turbine 145 is installed in a nacelle 146 in the usual manner, and said engine drives a propeller 147. Oil is supplied to the engine bearings and the like from an oil tank or reservoir 150 which is connected to a pump 151, the latter delivering oil to the engine through a conduit 152. Oil leaves the engine by way of a conduit 153 connected with a scavenging pump 154 which has an outlet connected with the cooler inlet 49 by means of the conduit 48. Oil from the cooler outlet is conveyed by the conduit 55 to a chamber 155 in a casing 156. The chamber 155 is connected with the oil tank 150 by means of a conduit 157.

Fuel for the engine is supplied from a suitable source such as a tank or reservoir 160 connected by a conduit 161 with the fuel pump 162 which, in turn, is connected with the inlet 134 of the cover 127 by means of a conduit 163. The outlet 135 of the cover 125 is connected with the engine by means of a conduit 164.

Air is used as a supplemental coolant and the flow thereof is controlled as will be hereinafter more fully described.

The cooler 10 is located adjacent the entrance of an air passage 170 which has an outlet controlled by shutter or flap 171 pivoted at 172 to the wall 173 of the passage 170. The shutter 171 is controlled by an actuating mechanism, indicated generally at 175, and said actuating mechanism comprises a casing 176 arranged to be pivotally secured by means of a bracket 177, to a fixed portion 178 of the aircraft structure. A screw 179 is rotatively supported in the casing 176 and has a part which projects therefrom, said screw being operated by a motor 180 through a suitable reducing gear within a housing 181 so that said screw is operated at a relatively low speed. A threaded sleeve 182 is received on the projecting part of the screw 179 and is provided with means, shown at 183, for pivotal connection with the shutter 171. The sleeve 182 is moved back and forth longitudinally of the screw 179 as the latter is rotated in clockwise and anticlockwise direction. The actuating mechanism 175 is controlled in accordance with the temperature of the oil passing through the chamber 155 (Fig. 5), there being a temperature responsive means or thermostat 185 located in said chamber 155.

Referring more particularly to Fig. 10, there is shown the electrical mechanism for controlling and operating the flap 171, this mechanism including a switch, indicated generally at 186, which has a switch part 187 connected to and controlled by the thermostat 185, said switch part being mounted on a pivotal shaft 188 which is rotated by the thermostat 185 as the latter changes temperature.

The switch 186 also includes switch members 189 and 190 which are pivoted at 191 and 192 respectively, said switch members being provided at their free ends with contact points 193 and 194 adapted to be contacted by a contact point 195 carried by the switch part 187, adjacent the free end thereof, said free end of switch part 187 being disposed between the switch members 189 and 190.

The switch members 189 and 190 are spaced apart from each other and are urged toward each other by springs, not shown. The members 189 and 190 are provided with cam followers 196 and 197 respectively which are adapted to operably engage a cam 198 rotatably disposed between said members 189 and 190, cam 198 being adapted to be operated at a relatively slow speed by an electric motor, not shown, this mechanism being disclosed in the J. M. Kemper, Patent No. 2,416,261. Switch part 187 is positioned by the thermostat 185 and the switch members 189 and 190 are oscillated or reciprocated through limited arcs of movement on opposite sides of the contact 195 by the cam 198. When the switch part 187 is centrally disposed, contact 195 will not be engaged by either of the contacts 193 or 194 as switch members 189 and 190 are reciprocated by the cam. Should the switch part 187 be swung from its centralized position, the contact point 195 thereof will be intermittently engaged by one or the other by the contact points 193 or 194 depending on the direction in which the part 187 has been moved from its centralized position. For example, should the oil which engages the thermostat 185 drop in temperature, said thermostat will swing the part 187 in a counterclockwise direction wherein the point 195 thereof may be engaged by the contact point 193 of member 189. The length of time that the contact 195 will remain in engagement with the contact 193 depends upon the distance part 187 is swung from its centralized position, and this distance will correspond to or be a measure of the drop in the oil temperature from a predetermined value for which the control is set.

Switch part 187 is connected to a ground 199 so as to be electrically connected to a source of power through ground 200, said source of power being shown as a battery 201. Should the contact 195 engage with contact 193, a relay 202 will be energized through a conductor 203. This relay 202 includes a motor switch, indicated generally at 204 which will be then closed so as to energize a winding 205 of the reversible motor 180. Power circuit 206 includes a source of power, shown as a battery 207, and energization of the winding 205 of motor 180 causes operation of said motor in a direction to effect closing of the flap 171. Should the contact 195 be moved in a clockwise direction from its centralized position so as to be engaged by the contact 194, the relay 209 will be energized through a conductor 210 and the switch 211 of the relay will be closed so as to cause a flow of current through a conductor 212. The reverse field winding 213 of the motor 180 will then be energized and cause the motor to operate in the opposite direction and effect opening movement of the flap 171.

Limit switches 215 and 216 are provided in circuit with the field windings 205 and 213 respectively to effect stopping of the motor 180 when it has operated to the limit of flap movement either in the closing or opening direction respectively. The switches 215 and 216 are actuated by a member 218 attached to the sleeve 182 of the actuating mechanism.

It is to be noted that the switch 186 and relays 202 and 209 are disposed in the housing 220, Fig. 5, and the wires connecting the electrical mechanism in said housing with the motor are carried in a cable 221.

Under normal operating conditions, the oil is warmed and will enter the cooler by way of the cooler inlet 49, incoming oil being indicated by the arrow 49a. This oil enters the housing chamber 47, passes through port 50 and into the inlet space A from which it flows into the passage 33, as indicated by the arrows 33a. From the passage 33, the oil flows through the port 32 and into the inlet chamber 25 of the core. In the core, the oil follows the tortuous flow path indicated by the arrows 227, Figs. 1, 2 and 3, and leaves the core through the outlet opening or port 35 to enter the passage 36. Thence the oil flows into the outlet space B in the fixture, then through port 106 to the outlet chamber 53 from which it passes from the cooler through the outlet 54 as indicated by the arrow 54a, Fig. 7. When the oil is cold, the valve 77, Fig. 6, is open and under such conditions the oil in the cooler core may be cold enough to be congealed. The hot oil will then enter the cooler inlet from the engine, flow through the passage 33, through the cross-over passage 44, into the passage 39 and into the warm-up outlet space C; thence, through a port 71 into the chamber 70 through the port 75 and into the outlet chamber 53 from which the oil will return to the engine.

The following may be taken as a typical example of the operation of the flow control valve mechanism. It is to be understood, of course, that the specific pressures referred to hereinafter are by way of example only.

Assume first that a cold start is to be made. The pressures will be high due to the fact that the oil in the cooler is congealed. Such pressures may be from 60 to 70 p. s. i. The surge valve 59 will start to rise, so as to partially open the port 61 and at the same time the poppet valve 57 will partially close the port 50. Hot oil from the engine will, therefore, flow from the chamber 47 into the chamber 52 and, thence, into the chamber 53 from which it will pass through the outlet 54 and back to the reservoir and from there to the engine. At 98 p. s. i. maximum, the surge valve 59 will be wide open and the poppet valve 57 closed, shutting off the cooler inlet so that the entire oil flow will be through the housing 46 and none of it through the cooler passages.

As the oil begins to warm up, the viscosity will become less and the pressure will drop so as to allow the surge valve 59 to close at 45 p. s. i. At this time, the surge valve 59 will be entirely closed and the poppet valve 57 wide open with no by-passing through the housing 46. The oil will then enter the passage 33 which also serves as part of the warm-up muff. At temperatures of 153° F. or less the thermostatic valve 77 will remain open and the oil will follow the path of least resistance through the cross-over passage 44 and passage 39 and thence to the cooler outlet 53 through the housing as hereinabove described. The oil will receive no cooling during this phase of the operation of the mechanism and will, therefore, warm up rapidly.

Due to the construction of the cooler core, the pressure drop across the cooler will rapidly decrease as the initially cold oil contained therein is warmed, so as to permit the flow of oil through the core. It is to be noted that the passages 33, 44 and 39 serve as a warm-up means which facilitate warming up of the oil in the core and the consequent decongealment of said oil.

The thermostatic material 103 of the thermo-responsive valve 78 will expand as the temperature rises, moving the valve 77 toward the closed portion, the valve 77 being completely closed when the temperature of the oil reaches approximately 163° F. The thermostatic element also contains a safety feature inasmuch as a sudden surge of pressure in the chamber 70 will cause the parts 93, 96, 77 and the parts associated therewith to move bodily against and force the spring 92 to relieve said surge pressure.

In view of the fact that during take-off, the fuel flow to the engine is at a maximum, such fuel, when passed in heat exchange relationship through the oil, may create a drop in temperature of the oil below a desired level. In other words, the oil may be cooled below the proper temperature for use in the engine. It is, therefore, necessary during this take-off period and during certain flight conditions (when flap 171 is closed) to modulate the oil flow by bypassing the oil about the cooling space of the cooler, this being effected by the thermo-responsive valve hereinabove described.

As the aircraft gains altitude and a cruise condition prevails, the fuel flow will drop so that all of the oil may be passed through the cooler core. Under such conditions, should additional cooling be desired or necessary, and as the fuel flow continues to decrease, the temperature responsive switch 186 is brought into operation to cause the flap 171 to be opened so as to permit air flow through the cooler to supplement the cooling effect of the fuel. The air flows through the tubes 14 which are not covered by the cover members 125 and 126 under these conditions.

I claim:

In a heat exchange apparatus: a tubular shell having an inlet port and an outlet port spaced therefrom; perforated header plates at respective ends of the shell; a plurality of thin walled radiator tubes extending longitudinally of the shell and having the respective ends thereof secured in the openings in said header plates, said tubes comprising the cooler core; a plurality of tubstantially parallel baffles within the core in laterally spaced relation with each other, thereby providing a series of compartments connected together at alternate ends so as to provide a tortuous flow passage through the core from said inlet port to said outlet port; means providing a flow path for a first coolant including elongated hollow caps secured to the respective header plates covering the respective ends of a group of tubes extending across the core so that there are tubes at the respective sides of the caps uncovered thereby, one of said caps having an inlet at one end and an outlet at the opposite end; baffle plates in said caps arranged so that a first coolant fluid entering the inlet of said one cap will flow back and forth through the tubes covered by said caps and be discharged from the outlet of said one cap; a second coolant being adapted to flow through the remaining tubes of the core; a flap for controlling the flow of the second coolant through said tubes; means for actuating said flap; and temperature responsive means for controlling the flap actuating means, said temperature responsive means being responsive to the temperature of oil being conditioned by said apparatus.

References Cited in the file of this patent

UNITED STATES PATENTS

| | | |
|---|---|---|
| 358,514 | Warden | Mar. 1, 1887 |
| 1,290,638 | Morgan | Jan. 7, 1919 |
| 1,876,648 | Elfes | Sept. 13, 1932 |
| 1,925,805 | Holle | Sept. 5, 1933 |
| 1,999,237 | Hobbs | Apr. 30, 1935 |
| 2,034,428 | DeBaufre | Mar. 17, 1936 |
| 2,181,354 | Winters | Nov. 28, 1939 |
| 2,348,212 | Gill | May 9, 1944 |
| 2,424,795 | Burns | July 29, 1947 |
| 2,459,490 | Booth | Jan. 18, 1949 |
| 2,480,120 | Cruzan | Aug. 30, 1949 |
| 2,501,012 | St. Clair | Mar. 21, 1950 |

FOREIGN PATENTS

| | | |
|---|---|---|
| 66,706 | Austria | May 1, 1914 |
| 232,309 | Great Britain | Apr. 14, 1925 |
| 253,233 | Great Britain | June 17, 1926 |
| 328,097 | France | Oct. 6, 1903 |
| 627,386 | Great Britain | Aug. 8, 1949 |